Jan. 23, 1945.  W. R. FERRIS  2,367,764
FREQUENCY MODULATION DETECTION SYSTEM
Filed Jan. 30, 1942
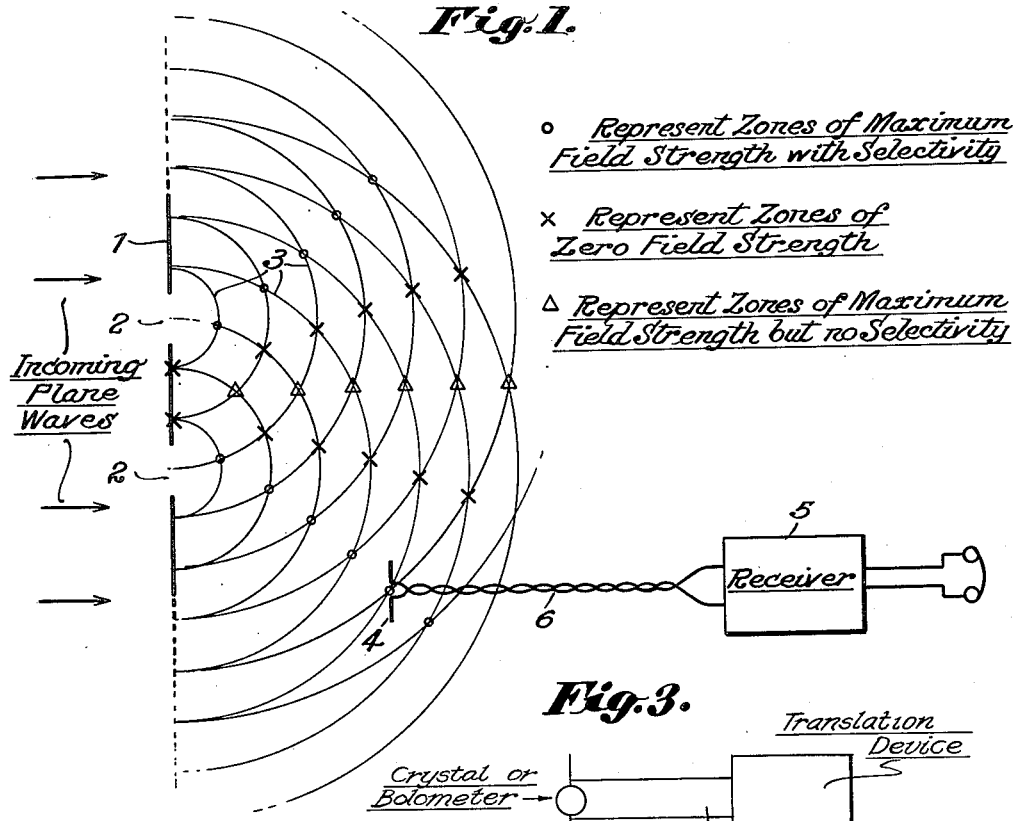
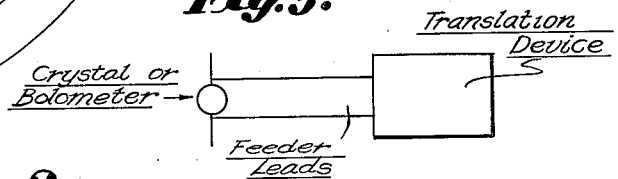
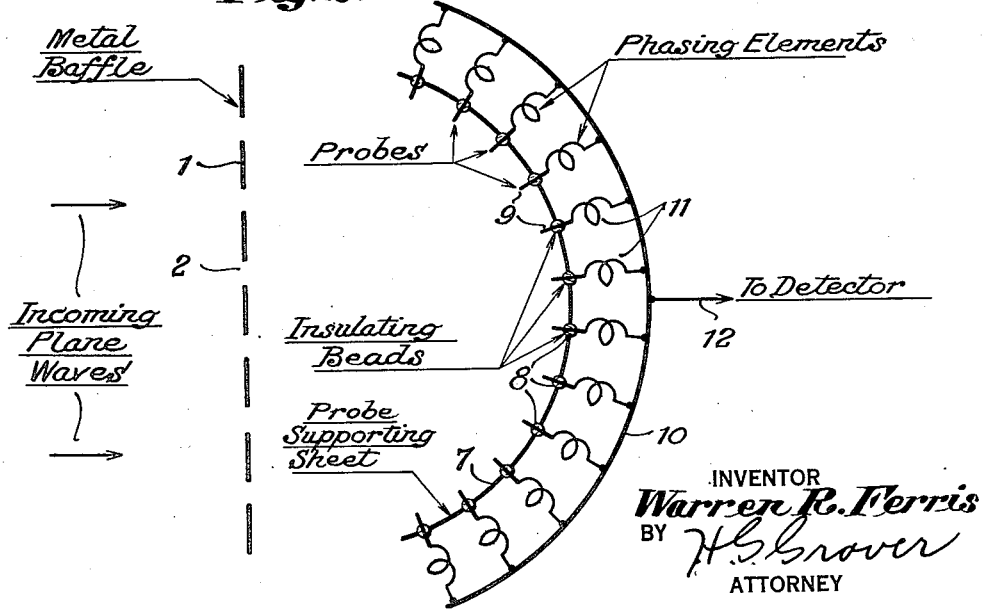
INVENTOR
Warren R. Ferris
BY H. S. Grover
ATTORNEY Patented Jan. 23, 1945

2,367,764

UNITED STATES PATENT OFFICE 2,367,764

FREQUENCY MODULATION DETECTION SYSTEM

Warren R. Ferris, East Orange, N. J., assignor to Radio Corporation of America, a corporation of Delaware Application January 30, 1942, Serial No. 428,821

15 Claims. (Cl. 250—20)

The present invention relates to an angular velocity modulation detection system of the phase or frequency modulation type, and has for its primary object to provide such a system, preferably a frequency modulation detection system, for use with extremely short waves below one meter and which avoids the need of conventional resonant circuits. The term "angular velocity modulation" is herein employed to designate generically either a phase or a frequency modulation system.

Although the principles of the invention are hereinafter described particularly in connection with waves of the order of one centimeter, it should be understood that the invention is not limited to this order of wavelength and may be used with longer waves, or with shorter waves of the order of millimeters.

Briefly stated, the present invention provides means for dividing an electromagnetic wave in space into a plurality of components, whereby there are produced zones of reinforced intensity and of destructive interference, and for collecting energy at locations where the component waves reinforce each other. For dividing the wave to be received into component waves, I employ a metallic baffle or sheet of suitable dimensions which is provided with a plurality of slits to enable the wave to pass through the baffle at a plurality of points. These component waves produce interference fringes in the manner of an optical diffraction grating, so that by suitably positioning a plurality of energy collectors in the form of dipole antennas or probes in the rear of the baffle I am able to detect the wave to be received at those locations where the interfering waves passing through the baffle reinforce each other. Although in theory there is a preferred relationship between the dimensions of the slits in the baffle, the frequency of the wave to be received, and the locations where the waves reinforce each other, in practice the locations for the pick up units may be obtained by trial. The baffle may comprise a metallic planar sheet whose width may be ten to one thousand times longer than its height and which is provided with numerous horizontal slits, each slit having a width which is of the order of the length of the wave to be passed therethrough. It is preferred that there be at least a hundred slits in the baffle, although fewer, or more numerous, slits can be employed. The distance betwen the slits may vary greatly from anywhere between a wavelength for the wave to be detected to ten or more wavelengths.

A more complete description of the invention follows in conjunction with a drawing, wherein Figs. 1 and 2 illustrate two different embodiments of the invention, and Fig. 3 illustrates an alternative form of energy collector which can replace those of Figs. 1 and 2.

Fig. 1 depicts the simplest arrangement of the invention which employs the minimum number of elements. In Fig. 1 the metallic baffle is represented by numeral 1.

This baffle is composed of a planar sheet provided with two slits 2, 2. The dotted lines are intended to represent that the baffle extends further than the limitation imposed by the amount of space available on the drawing. The slits are parallel. The curved lines 3 between the imperforate sections on one side of the baffle illustrate, by way of example, the instantaneous wave form which may be taken by the component waves which are divided out from the wave source on the other side of the baffle representing the electromagnetic wave in space to be received. The imperforate sections of the baffle should be opaque to the radiation, and should be sufficiently large to cast an effective shadow over the space behind the baffle in which the detectors to be later mentioned are located. For detecting the frequency modulated wave, there is provided a dipole 4, illustrative of many possible similar energy collectors, which is located at a point where the component waves reinforce each other. This dipole may have an overall length approximating one-half wavelength at the operating frequency, and is connected to suitable detecting apparatus 5 by means of a two-conductor feeder 6. Apparatus 5 may be of the type which employs a crystal detector. The difference in path lengths from the inividual slits 2 to the location of the dipole 4 should be a whole number of wavelengths at the operating frequency to a first approximation. In practice, it will be found that there are zones of zero field strength, zones of maximum field strength with selectivity, and zones of maximum field strength but with no selectivity. The word "selectivity" refers to frequency discrimination. Reference to Fig. 1 shows that the zones of maximum field strength but no selectivity are on a line midway between the slits. Radiation of any frequency will have maximum intensity along this line. The other curved lines show maxima at certain points, the location of these points depending upon frequency. The dipole 4 should, of course, be preferably located in a zone of maximum field strength having selectivity.

As an ilustration of the dimensions to be employed, if we assume that the freuency modulated wave to be received is one centimeter long, then the slits 2 may be one centimeter wide; while the distance betwen slits may be anywhere from one to ten centimeters or so. The arms of the dipole should then each be two and one-half millimeters long (equivalent to one-half wavelength), thus giving an overall length for the dipole of five millimeters or one-half centimeter. It would probably be advantageous to use inductance or capacitance loading to reduce the actual length of the dipole antenna considerably.

The dipole 4 is merely an example of any suitable pick-up device or energy collector, and may be replaced by a probe, as illustrated more completely in Fig. 2. Where a plurality of dipoles are employed, and this would be the preferred arrangement, they would be arranged in a semicircle in the high intensity zone for the interfering waves at spaced maximum points for positive peaks, in which case the transmission lines or feeders from the dipoles would be connected in electrically parallel relation, and the individual lines or feeders given such lengths that the energies combine in phase at a common junction point leading to the detector. The distance between the dipoles of the multiple array would be governed by the dimensions of the baffle slits. By adjusting the physial dimensions of the baffle 1, including adjusting the widths of the slits and the distances between silts, or by changing the radius of the dipole array (or probes in the case of Fig. 2) and the distance from the baffle, I can place the energy collecting units at the proper locations for obtaining the maximum energy. The spacings and shapes of the baffles, slits etc. should be governed by the well known optical relations dealing with diffraction gratings.

In Fig. 2, I show the use of a multiplicity of probes 9 for energy collectors. These probes are located in a semi-circle on a metal supporting sheet 7. but insulated therefrom by insulating beads 8. The probes may be considered as positioned on the surface of an imaginary cylinder. The probes are connected together by an interconnecting wire or metallic strip 10, and each probe is connected to the element 10 through a phasing element 11 of such apropriate length as to cause all energies collected in the probes to additively combine in conductor 12 extending to suitable detecting equipment. This detecting equipment may be of any suitable kind known in the art for detecting such extremely short waves, and may include a crystal or a bolometer.

When multiple energy collectors (probes or dipoles) are employed in the practice of the invention for detecting frequency modulated waves, the energy collectors are placed at such locations that there is most favorable reception when there exists maximum frequency deviation of the frequency modulated wave to be received. In this condition, peak energy is applied to the detector. As for the unmodulated carrier, it will be apparent that under the foregoing condition there will be less energy picked up at the energy collectors, and by the same reasoning, when the frequency deviation is maximum on the other side of the carrier there will be substantially twice the drop in received energy at the collectors as compared to the case of the energy received for the unmodulated carrier. It will thus be evident that reception is substantially linear or is at least a function of frequency departure. In practice, the foregoing procedure may be folowed out by locally and temporarily supplying on one side of the baffle an unmodulated wave whose frequency corresponds to a frequency modulated wave having a maximum frequency shift in one direction and by placing the energy collector or collectors on the other side of the baffle at such location or locations to receive maximum energy. When this is done, then automatically the energy detected at the carrier frequency and at the frequencies on the other side of the carrier will be less than the first detected energy.

It is contemplated that at waves below one centimeter, in the millimeter range, in employing dipoles, that a crystal be placed across the adjacent ends of the dipole arms, in which case the current in the feeder leads would be direct current and there would be no necessity for using phasing elements. Alternatively, a bolometer can be employed across the arms of each dipole, and the change in resistance thereof made to affect a suitable detector device connected thereto (bridge arrangement or otherwise). Fig. 3 diagrammatically illustrates energy collectors of the foregoing types which can replace the energy collecting system of Fig. 1. However, with separate detectors, somewhat less sensitivity would result if the detectors were of the "square law" type. This might be offset in practice by the simpler construction.

If desired, a concave grating can be used instead of the planar baffle, in order to produce focusing in the manner of optical gratings and thus avoid most of the multiple probes. The design of these gratings is exeremely complex and is usually done by approximating and idealizing the wave patterns.

An advantage of the present invention is that there is eliminated the need for employing conventional electrical circuits employing inductors and capacitors for detecting frequency modulated waves.

What is claimed is:

1. A frequency or phase detection system for short waves below one meter, comprising means for dividing the space radiation into two or more portions and for causing these portions to reinforce each other in space, and a detecting element located at a point where the portions reinforce each other.

2. A frequency or phase detection system for short waves below one meter, comprising a metallic baffle having a plurality of slits for dividing the space radiation into component waves which interfere in space, and an energy collector mounted within the interference zone of said component waves at a location where said component waves reinforce each other.

3. A frequency or phase detection system for short waves below one meter, comprising a metallic baffle having a plurality of parallel slits for dividing the space radiation into component waves which within a zone interfere and reinforce one another at different locations, and a plurality of energy collectors located at certain of those locations where the component waves reinforce one another, and means for combining the energies collected at said last locations.

4. A system in accordance with claim 3, characterized in this that said energy collectors are positioned on a line forming part of a circle.

5. A system in accordance with claim 3, characterized in this that said energy collectors are positioned on the surface of an imaginary cylinder.

6. A frequency or phase detection system for short waves below one meter, comprising a metallic baffle having a plurality of parallel slits for dividing the space radiation into component waves which within a zone interfere with and reinforce one another at different locations, the dimensions of said slits being of the order of the length of the wave to be received, and a plurality of energy collectors located at certain of those locations where the component waves reinforce one another, and means for combining the energies collected at said last locations.

7. A frequency or phase detection system for short waves below one meter, comprising a metallic baffle having a plurality of parallel slits for dividing the space radiation into component waves which within a zone interfere with and reinforce one another at different locations, and a plurality of energy collectors positioned at points of most favorable reception when there exists maximum frequency deviation of the frequency modulated wave to be received, and means for additively combining the energies collected at said points.

8. A system in accordance with claim 3, characterized in this that said means includes phasing elements of such lengths that the collected energies combine in-phase at a common junction point.

9. A system in accordance with claim 2, characterized in this that said energy collector is a dipole having two arms between adjacent ends of which there is connected a crystal.

10. A system in accordance with claim 2, characterized in this that said energy collector is a dipole having two arms between adjacent ends of which there is connected a bolometer.

11. A system in accordance with claim 3, characterized in this that said energy collectors are probes.

12. A system for converting frequency or phase modulated waves to amplitude modulated waves, comprising means for dividing said frequency or phase modulated waves into two portions, causing said two portions to pass over space paths of different lengths, and combining said two portions after they have traversed said space paths at a location in space where said portions interfere with each other to produce amplitude modulated waves.

13. A method for converting frequency or phase modulated waves to amplitude modulated waves, comprising dividing said frequency or phase modulated waves into at least two portions by passage of the waves through spaced slits of a planar sheet, causing said two portions to pass over space paths of different lengths, and combining said two portions after they have traversed said space paths at a location in space where said portions interfere with each other to produce amplitude modulated waves.

14. A system for converting one type of modulated waves to another type of modulated waves, comprising means for dividing said first type of modulated waves into two portions, causing said two portions to pass over space paths of different lengths and combining said two portions after they have traversed said two space paths at a location in space where said portions interfere with each other to produce said second type of modulated waves.

15. A detection system for converting waves of one type of modulation radiated in space and impressed upon said detection system into waves having a different type of modulation, comprising a planar sheet having a plurality of spaced slits for dividing the waves of said first type impinging on said sheet into a plurality of component waves which interfere in space, and an energy collector within the interference zone of said component waves at a location where said component waves reinforce each other.

WARREN R. FERRIS.